(12) United States Patent
Park

(10) Patent No.: US 7,624,778 B2
(45) Date of Patent: Dec. 1, 2009

(54) TRACTION DEVICE FOR DUAL WHEELS

(76) Inventor: Il Jun Park, #106-703 Daelim Apt., 415-1, Susaek-dong, Eunpyeong-gu, Seoul (KR) 122-755

(*) Notice: Subject to any disclaimer, the term of this patent is extended or adjusted under 35 U.S.C. 154(b) by 178 days.

(21) Appl. No.: 11/663,019

(22) PCT Filed: Oct. 26, 2005

(86) PCT No.: PCT/KR2005/003584

§ 371 (c)(1),
(2), (4) Date: Mar. 15, 2007

(87) PCT Pub. No.: WO2006/049403

PCT Pub. Date: May 11, 2006

(65) Prior Publication Data

US 2007/0251064 A1 Nov. 1, 2007

(30) Foreign Application Priority Data

Nov. 3, 2004 (KR) .................. 10-2004-0089082
Jan. 13, 2005 (KR) .................. 10-2005-0003429

(51) Int. Cl.
B60C 11/00 (2006.01)
B60C 27/00 (2006.01)
(52) U.S. Cl. ....................... 152/220; 152/219
(58) Field of Classification Search ............. 152/213 R, 152/216, 213 A, 217–220, 222
See application file for complete search history.

(56) References Cited

U.S. PATENT DOCUMENTS

| 1,239,745 | A | * | 9/1917 | Timerman | 152/219 |
| 1,329,766 | A | * | 2/1920 | Holmes | 152/220 |
| 1,374,771 | A | * | 4/1921 | Smith et al. | 152/219 |
| 1,457,116 | A | * | 5/1923 | Lion | 152/220 |
| 2,166,454 | A | * | 7/1939 | Wannemacher | 152/220 |
| 3,581,797 | A | * | 6/1971 | Kinnucan | 152/220 |
| 3,696,852 | A | * | 10/1972 | Oulman | 152/220 |
| 3,750,734 | A | * | 8/1973 | McCord | 152/220 |
| 2008/0271828 | A1 | * | 11/2008 | Shin | 152/213 A |
| 2009/0050249 | A1 | * | 2/2009 | Shin | 152/213 R |

FOREIGN PATENT DOCUMENTS

| JP | 1-208210 | 8/1989 |
| JP | 2004-001592 | 1/2004 |
| KR | 20-0221687 | 4/2001 |

* cited by examiner

Primary Examiner—Jason R Bellinger
(74) Attorney, Agent, or Firm—The Webb Law Firm

(57) ABSTRACT

The present invention relates to a sliding prevention device for a vehicle, which includes a plurality of spikes, each of which is formed with a supporting device supported between the tires of the dual wheels, a braking plate engaged with the supporting device in the outer peripheral edge of the dual wheels to produce the braking power by contacting with the dual wheels, and an engaging portion formed at an inward apex between the tires of the dual wheels; an interval maintaining device adapted to engage with engaging portion of the spike; and a locking portion.

11 Claims, 14 Drawing Sheets

[Fig. 1]
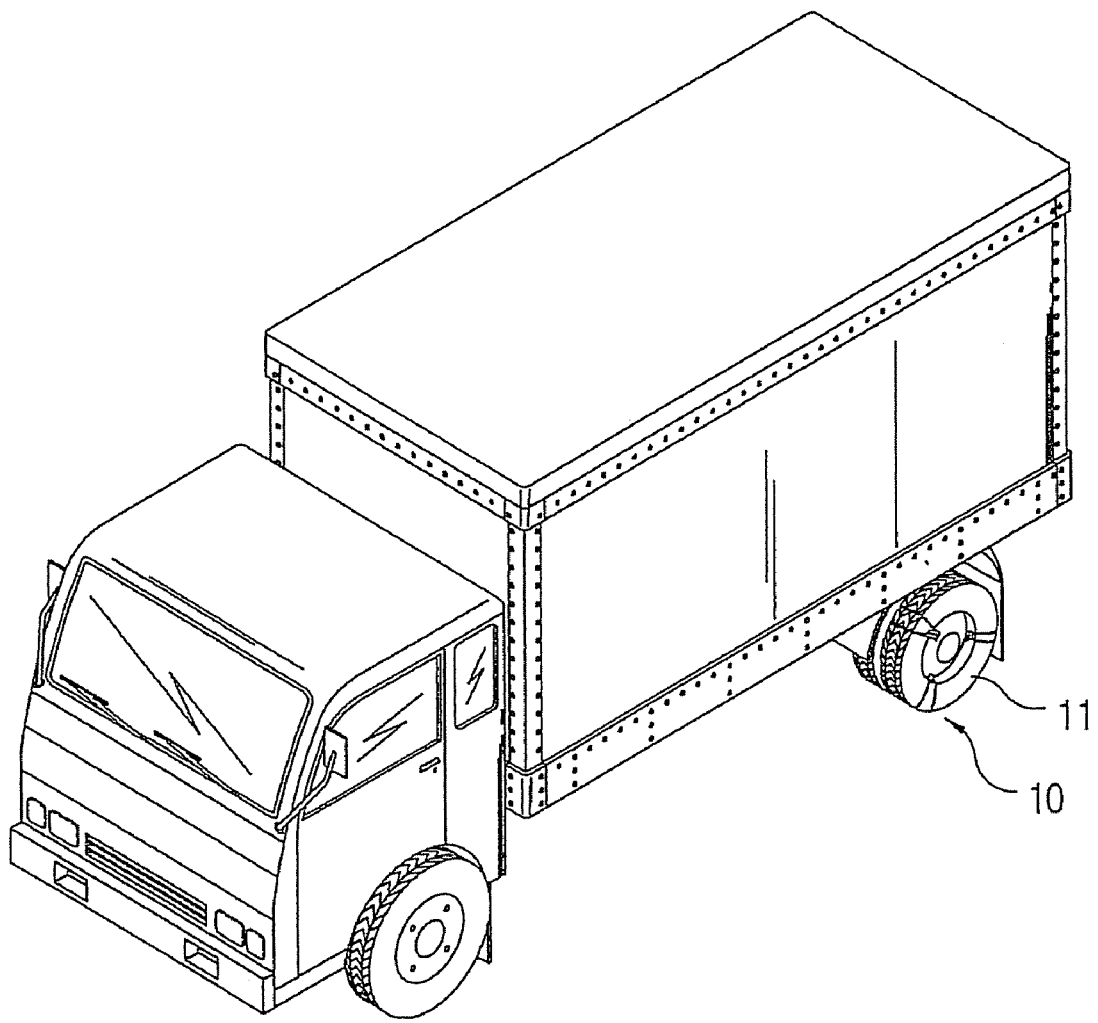
--PRIOR ART--

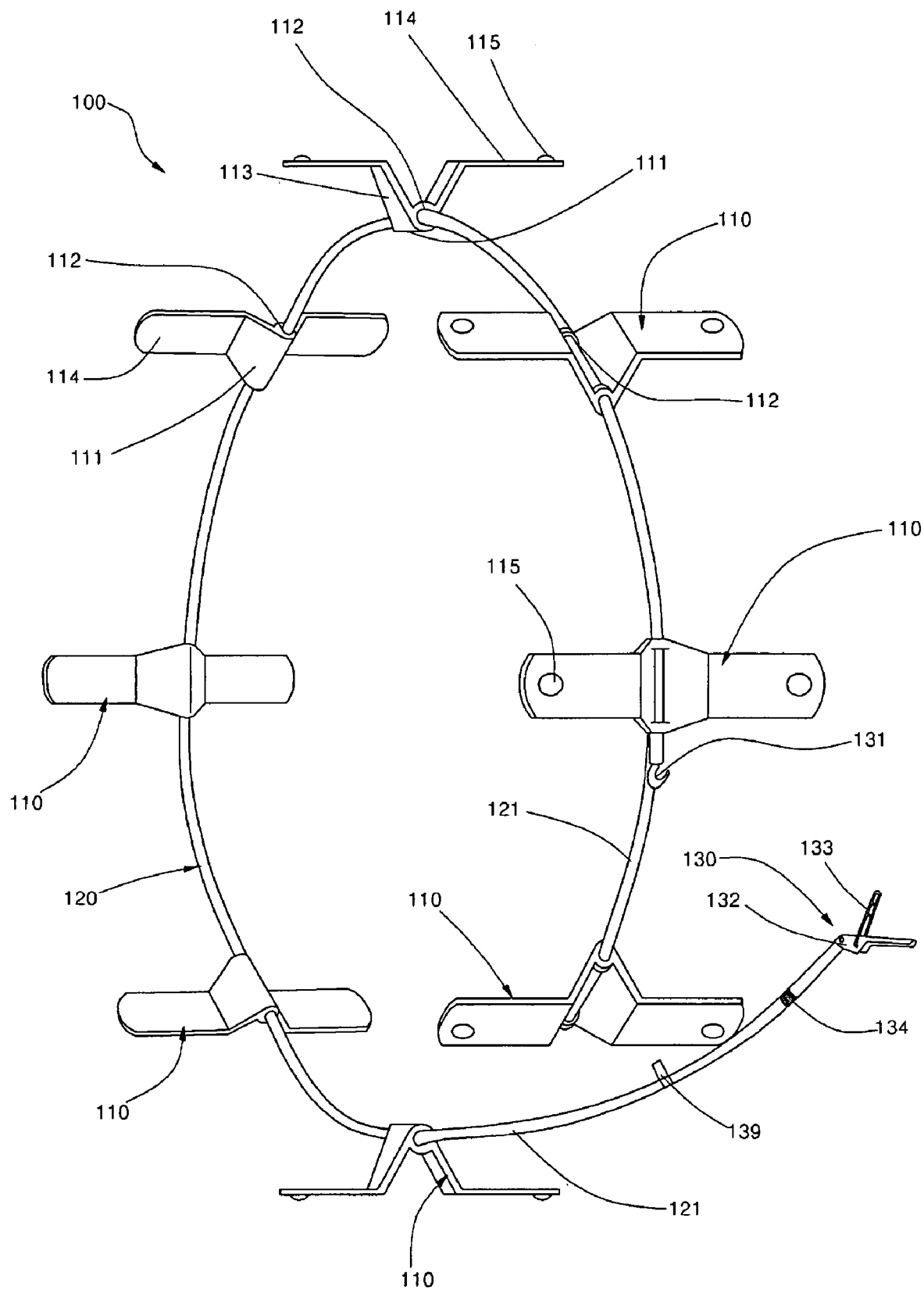
[Fig. 2]

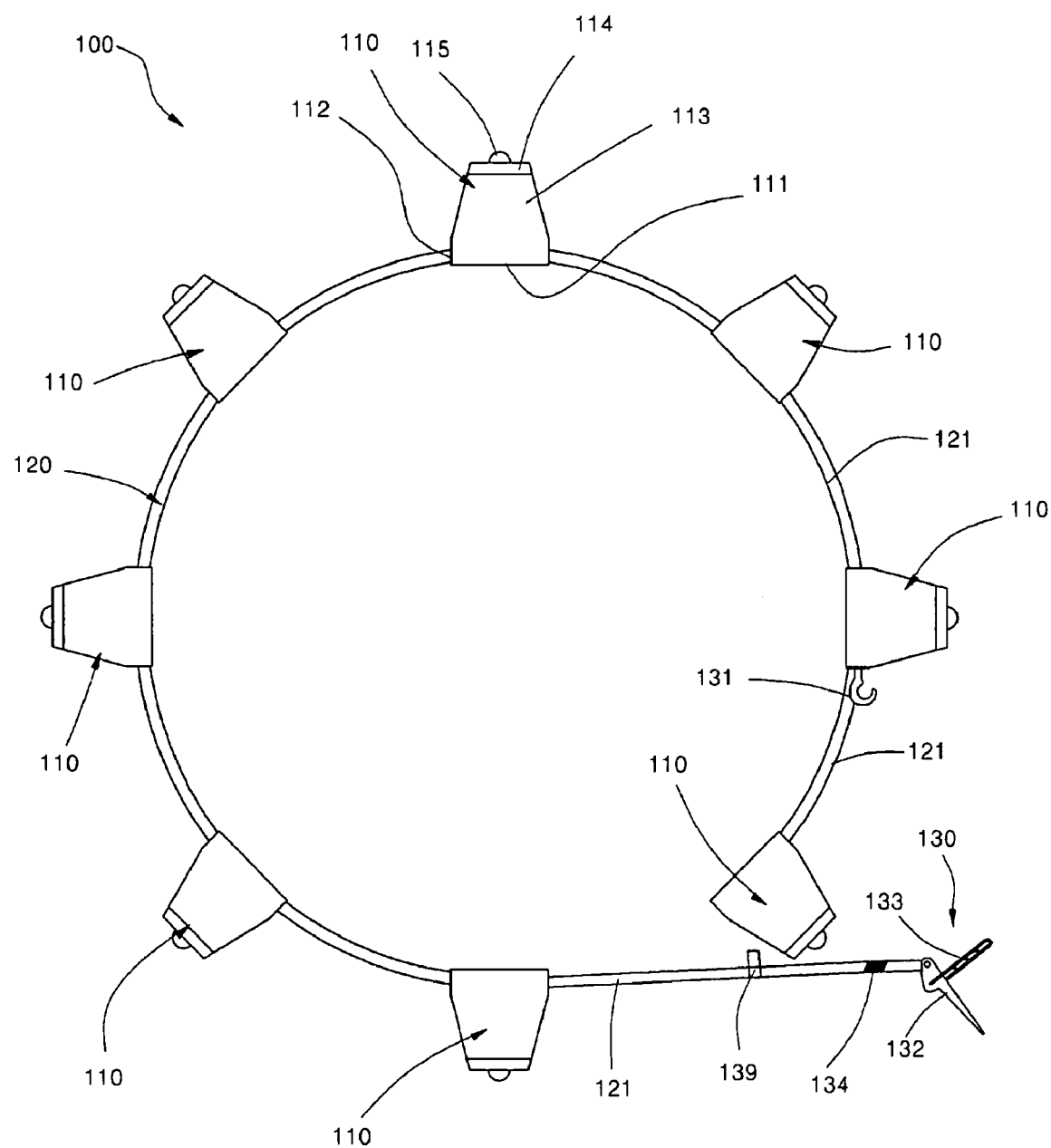

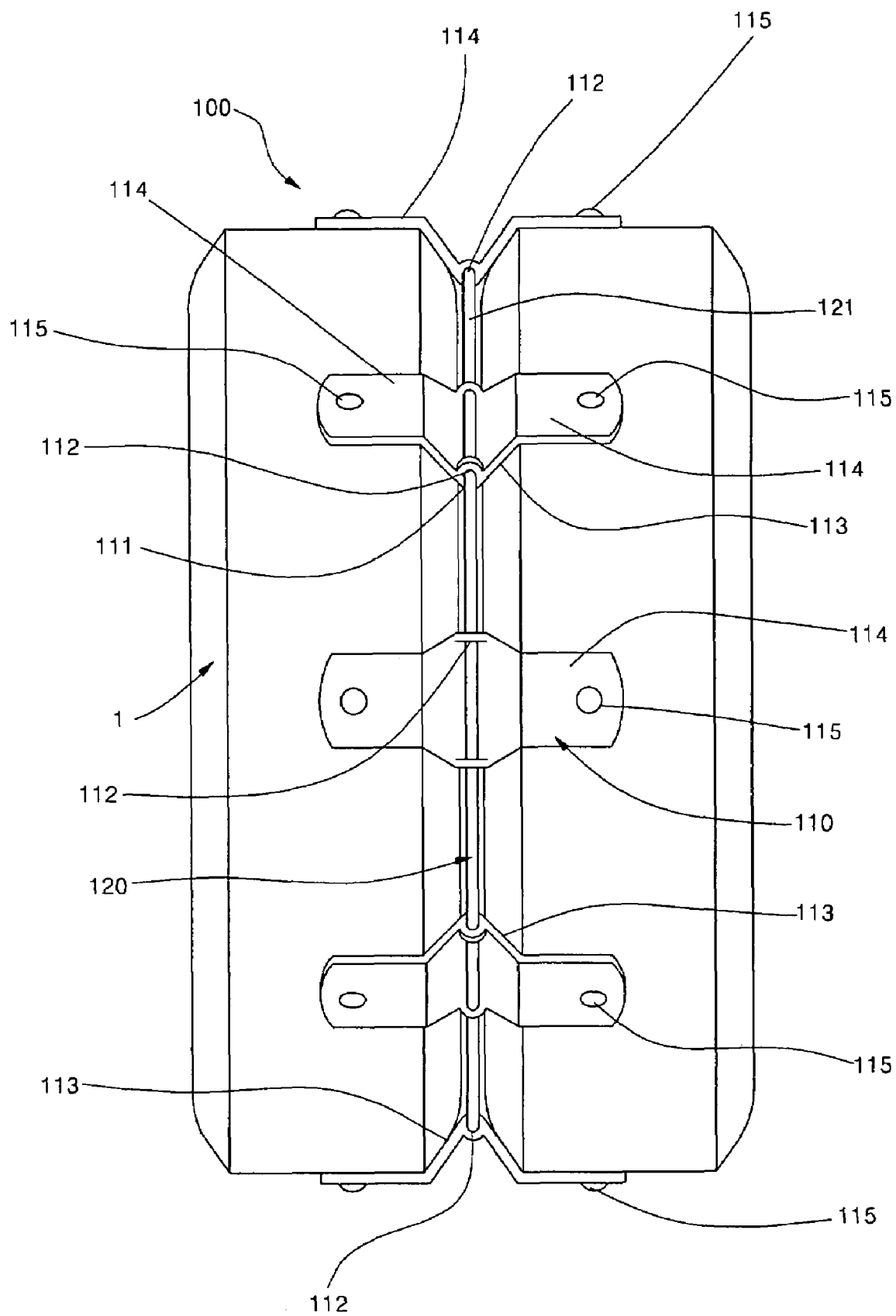
[Fig. 4]

[Fig. 5]
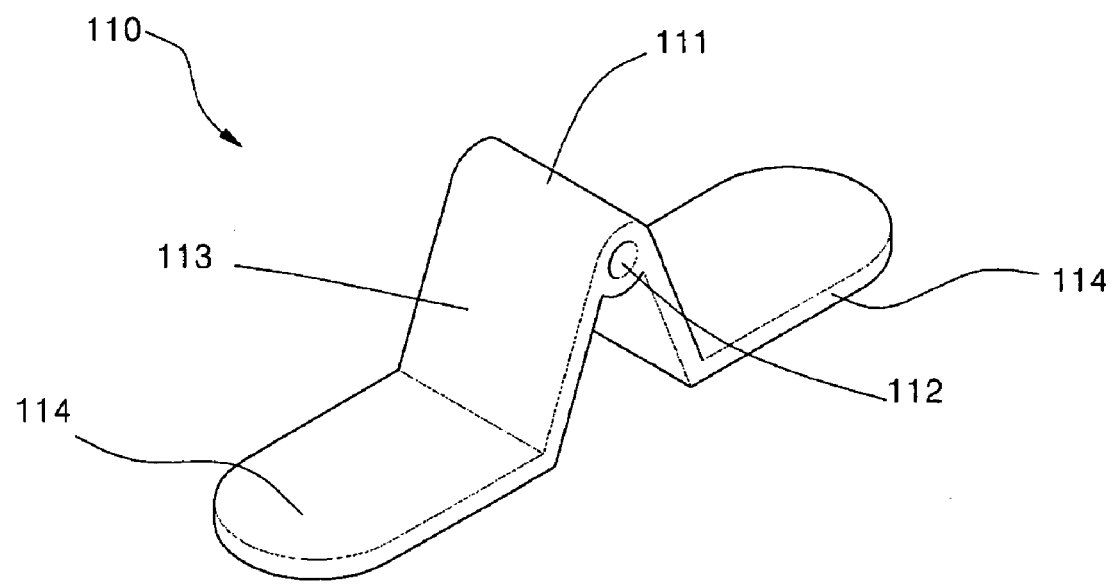
[Fig. 6]
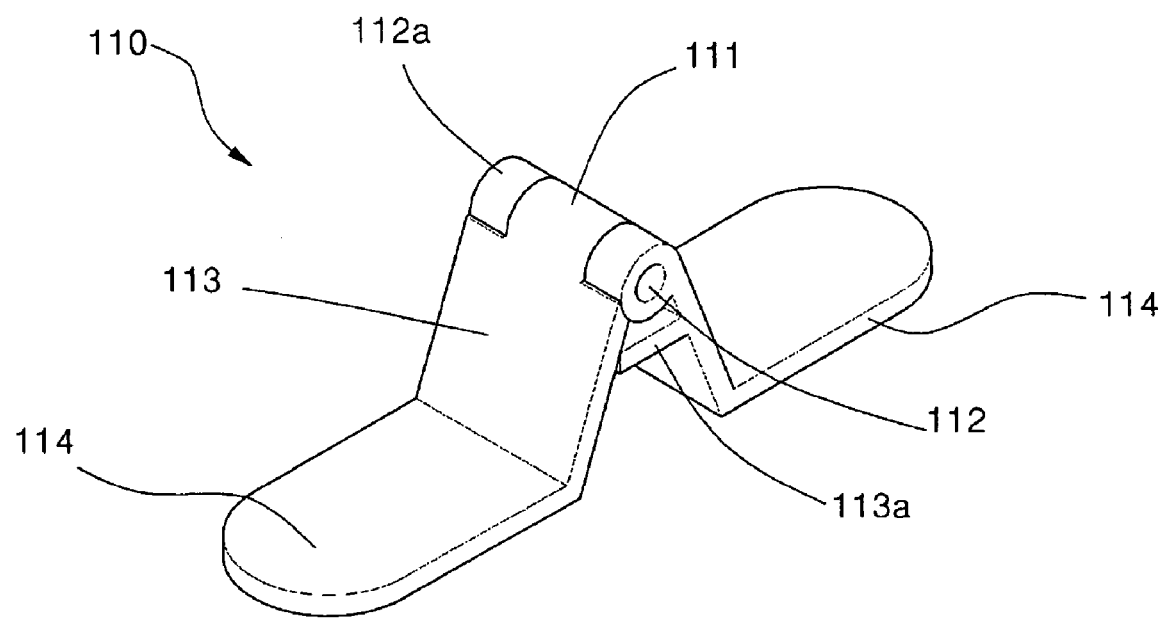

[Fig. 7]
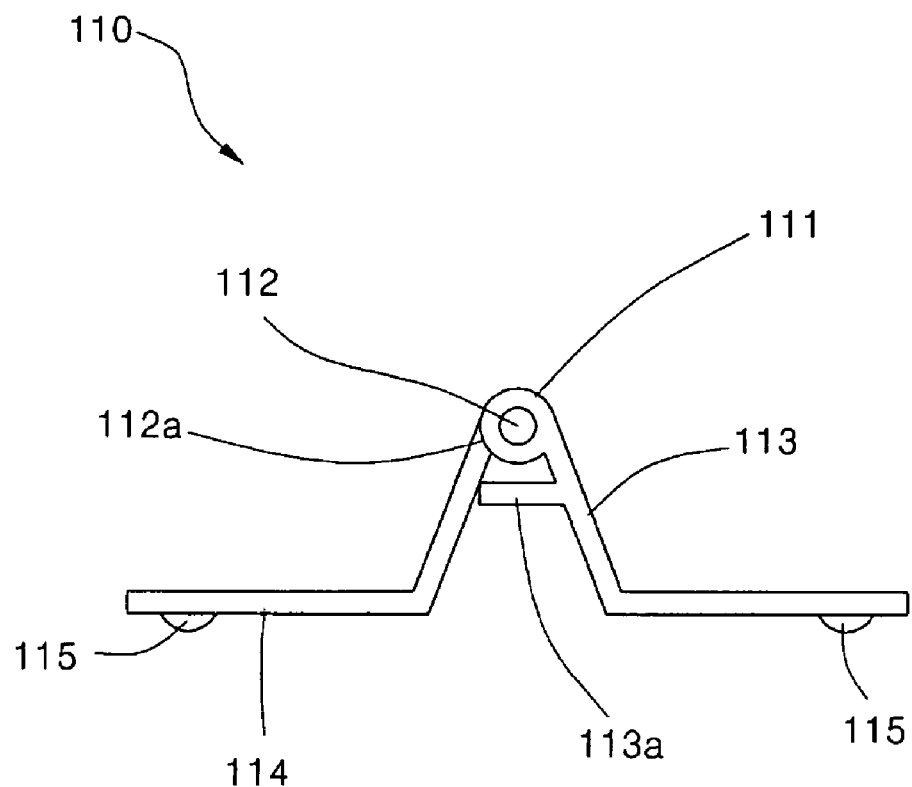
[Fig. 8]
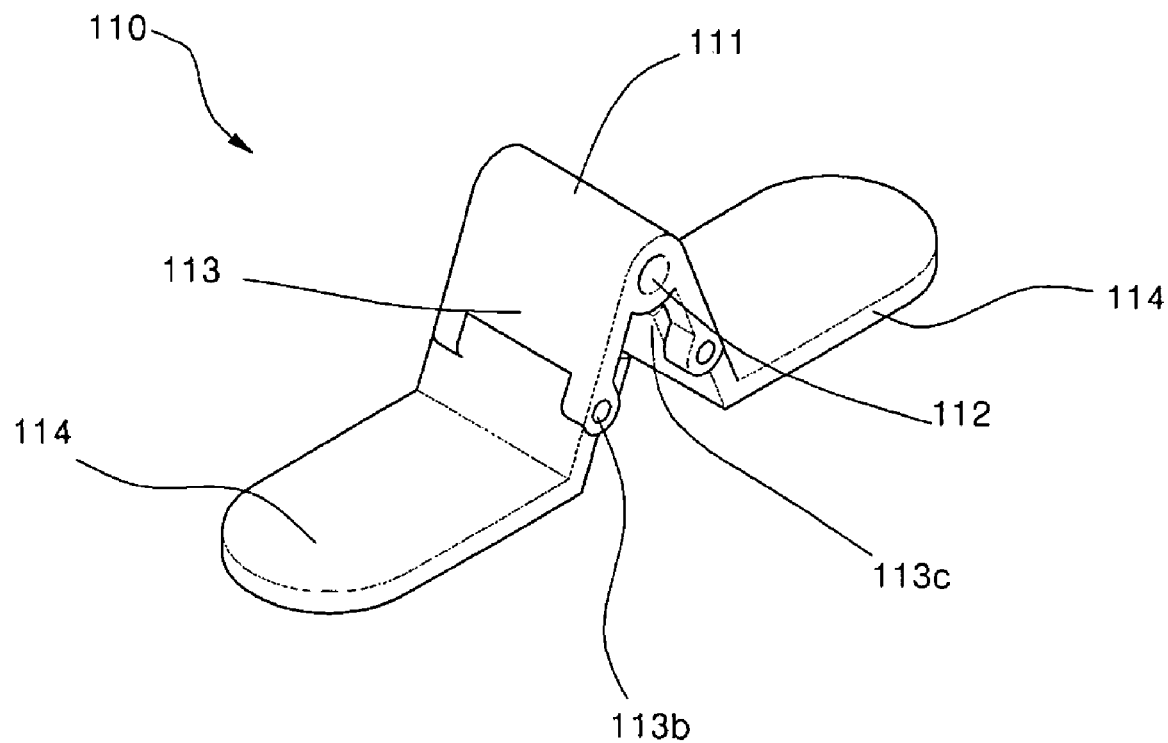

[Fig. 9]
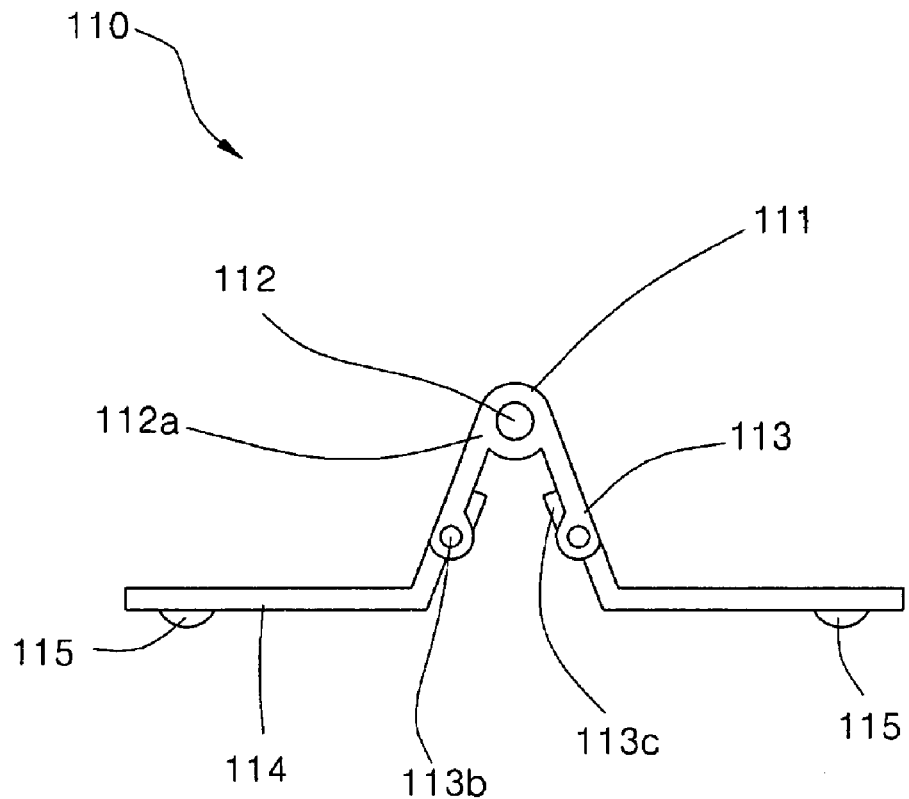
[Fig. 10]
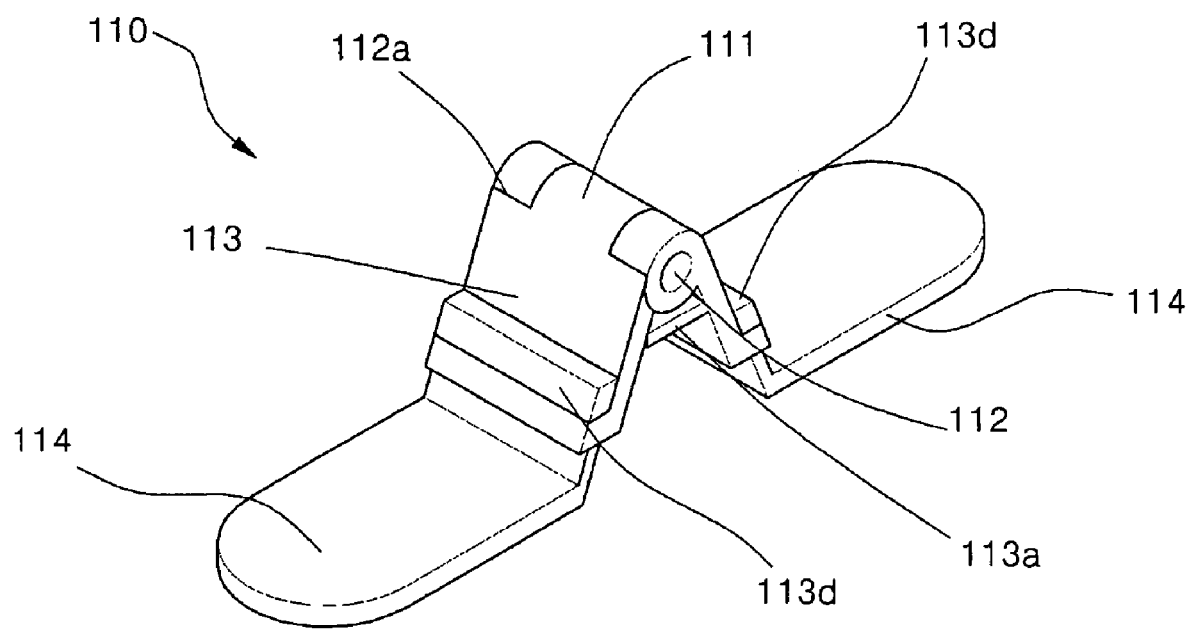

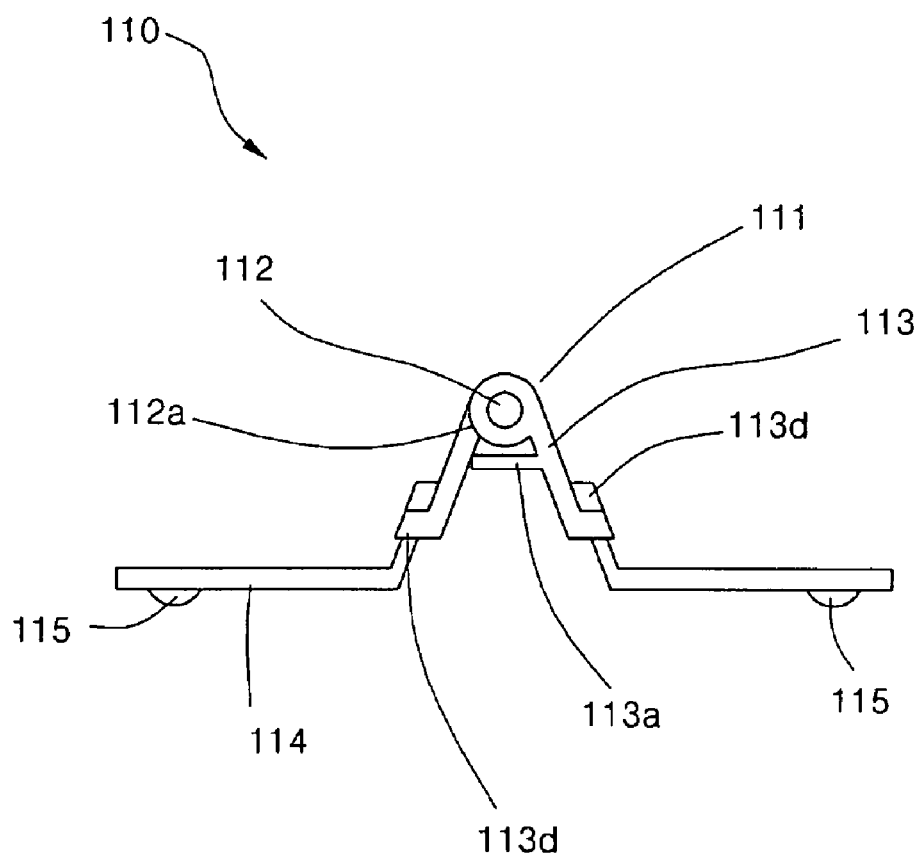
[Fig. 11]
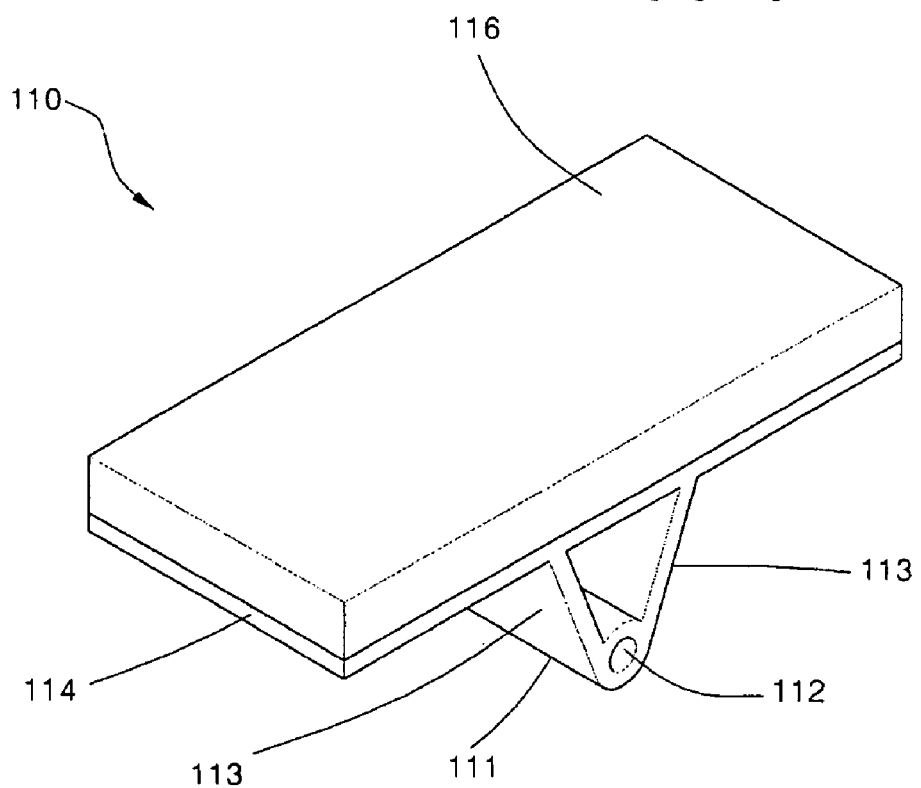
[Fig. 12]

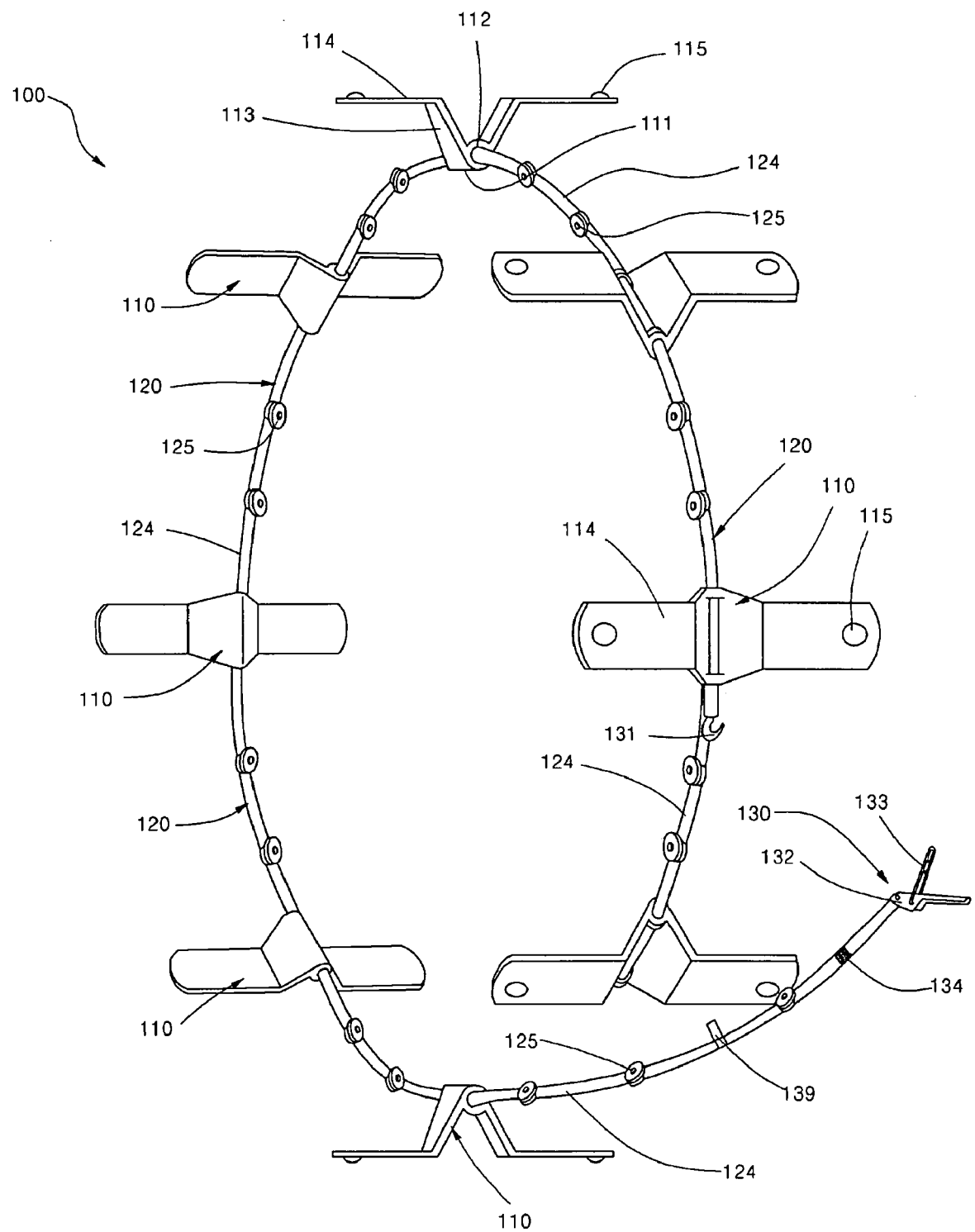
[Fig. 13]

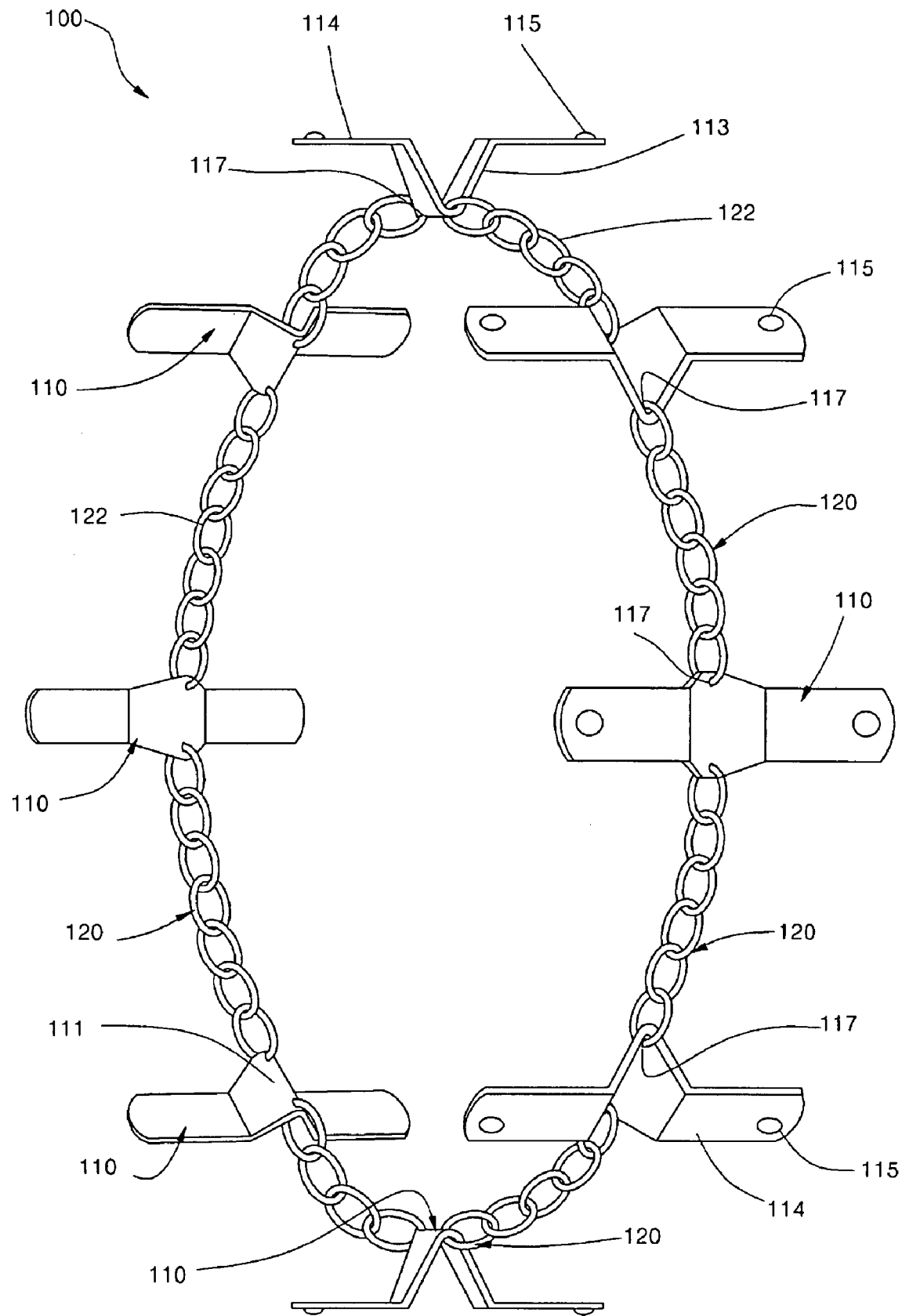
[Fig. 17]

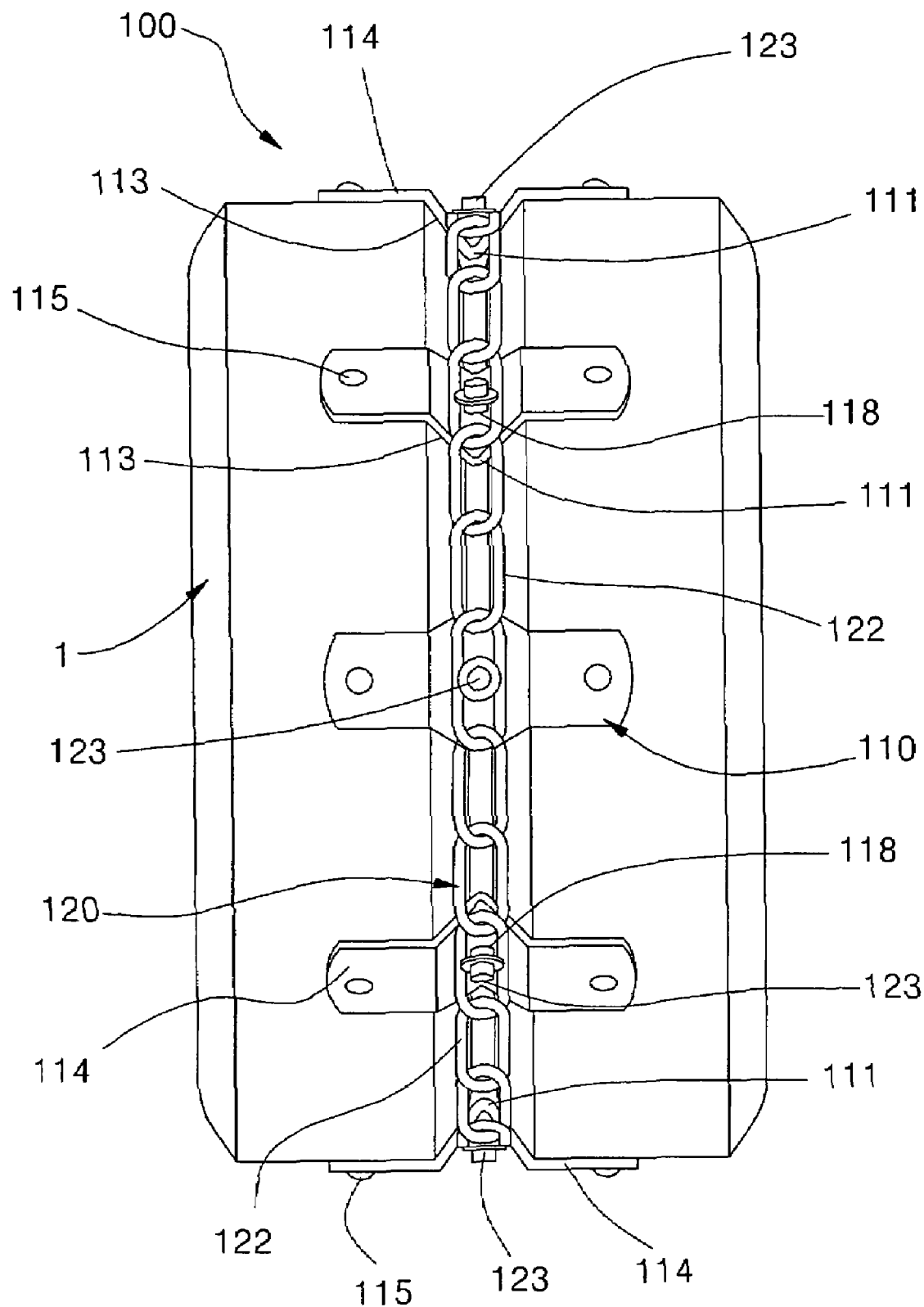
[Fig. 18]

TRACTION DEVICE FOR DUAL WHEELS

FIELD OF THE INVENTION

The present invention relates to a sliding prevention device for a vehicle, in particular to a sliding prevention device in which a plurality of spikes with brake plates having brake projections or brake openings are installed accurately at a space provided between dual tires installed to a rear wheel of a large vehicle for transporting passengers and/or freights depending on the topology or state of the road surface according to the weather, by means of a locking device with certain intervals maintained therebetween, so that it is installed between the dual wheels of the large vehicle wherein a significant amount of pressure is applied to the downward direction to facilitate attachment and detachment, it is excellent in adaptability to the topology because the brake plate and the spike can be easily replaced and used according to the circumstances such as an icy road, a snow covered road, a desert, a swamp area, wet road, and so on in preparation for the bad weather. It is possible to greatly increase stable driving power and stop force to thereby increase the velocity of the large vehicle driving slowly according to the state of the road surface and minimize the danger of accidents to enhance safety.

DESCRIPTION OF RELATED ART

In general, a snow chain installed to the tires of a vehicle in a case of freezing of the road due to snow is employed to prevent sliding of the vehicle due to bad weather. However, the chain cannot be used in areas having a high risk of an accident occurring because of damage to the road, such as a highway, therefore, a special type of tire, such as a snow tire or a spike tire, is installed to prevent sliding of the vehicle.

A ladder-shaped chain made of cables or an integral type snow chain made of urethane and by connecting chains into a block form is employed for most of such snow chains. In case of the integral type snow chain, connection links or connection cables can be disconnected during driving to thereby cause loss of the securing force in the whole snow chain so that the whole snow chain is separated from the tire and lost.

Furthermore, in case of the integral type snow chain, it is difficult for female drivers, the elderly, and the disabled to install and detach, and is difficult to rapidly install upon confronting an emergency snow covered road or an icy road, and is difficult to replace the chain on a steep sloped road, as the snow chain should be installed by movement of the vehicle to the right and left.

Also, the integral type snow chain is used for installment on the tires of automobiles, so that, in case of a bus or a freight car transporting passengers or freight, it would be difficult to install the snow chain to the larger vehicle with dual wheels, which is installed on the rear wheel for transferring the power, and the tires of the dual wheels being employed to reduce puncture danger by decreasing the load applied to the respective wheels. It is more advantageous for impact on the road surface when the diameter of the tire becomes smaller to decrease the volume of the air injected into the respective tire.

In addition, the integral type snow chain is complicated to install and remove. Also it is impossible to have effective securing force and power transmission as the securing force and close attachment force are smaller when the snow chain fabricated for the car is installed to the tires of the freight vehicle or the bus, considering that a tire width of the dual wheels for the transporting vehicle being relatively narrow and the diameter thereof are smaller.

To solve problems described above, as shown in FIG. 1, there is a proposed snow chain for installing to the dual wheels of the large vehicle.

In the conventional snow chain 10, a plurality of snow chains are configured to be installed to the dual wheels 11 provided at the rear wheel side of the large vehicle to pass through the center of the tires. The conventional snow chain is constructed to be installed when being inserted into the center of the tires, so that it is simple and easy to rapidly install regardless of the weight of the vehicle. It is possible to install in a stopped position to thereby facilitate installment, and can be utilized generally regardless of the size and area of the general wheel or the dual wheels as it can be adjusted depending on the size of the tire.

However, the conventional snow chain is configured to be secured to the inside from the outer peripheral edge of the tire so that it can be rotated according to the rotation of the tire, therefore if the stopping power is continuously transmitted to the tire rotating at high velocity, the whole and uniform braking power is not transmitted to the dual wheels because an interval between the tire and the snow chain is not maintained and concentrated in any one direction. Further, the load is concentrated on the chain where the interval is concentrated to result in the damage or separation of the chain.

Also, in the conventional snow chain, load is concentrated on the snow chain with the spikes, which is provided with the stopping power produced from the weight of a large vehicle loaded with freight, so that the engaging portion of the snow chains, is disengaged to thereby counterbalance the braking power and increase the possibility of a major accident.

Further, although the conventional snow chain is configured to produce braking power by contacting the road with the projected spikes, so that the vehicle can safely drive on the icy road during snowfalls and rainfalls in winter. It is prevented from use because the road may be seriously damaged and it is also prevented from use on the highway because of the possibility of accidents caused from road damage in winter, resulting in the reduction of use efficiency due to decrease of use.

Lastly, as the conventional snow chain is configured so the spikes are installed directly to the dual wheels which can be changed in volume because of the cushion under the road conditions without any maintaining means for intervals, major accidents can be caused because the plurality of snow chains are concentrated in any one direction during driving on the non-uniform topology to be encountered, so that braking power is produced in one direction to cause the centrifugal force produced by urgent cornering in an unintended direction different from the driver's handling direction.

SUMMARY OF THE INVENTION

The present invention has been made to solve the above-mentioned problems occurring in the conventional art, and the object of the present invention is to provide a sliding prevention device for a vehicle, which can solve the above-mentioned problems occurring in the conventional art.

Concretely, the primary object of the present invention is to provide a sliding prevention device for a vehicle which is improved in the installing capacity because it is constructed of light spikes and wire to thereby facilitate installment, and in which a plurality of spikes are provided to be formed with a triangular shaped wide surface facing the outer peripheral edge of the tire so that they can be supported between the tires of the dual wheels installed at the rear side of a large vehicle, a portion contacting the side of the tire from the center to the right and left, a braking plate attached at the outer peripheral edge of the tire, and an engaging portion of the supporting device for the spike at the apex of the triangle directed toward the inside of the tire. An interval maintaining device is also provided to engage the plurality of spikes to each other at certain intervals by inserting the wire into the engaging portion, and a locking portion is provided at the end of the interval maintaining device for adjusting the length and engaging by an operation, so that the spikes, which is formed with a plurality of braking plates between the tires of the dual wheels, is connected and secured by the locking portion at certain intervals. That is, the plurality of spikes are positioned between the tires and the interval maintaining device is passed between the tires to thereby make them easily engage by the locking portion.

Another object of the present invention is to provide a sliding prevention device for a vehicle which can increase the driving capacity to thereby minimize the possibility of accidents because it is possible to produce braking power accurately and drive while carrying heavy freight by providing the spikes between the tires of the dual wheels which are installed at the rear side of the large vehicle, and by providing the braking plate between both tires, to thereby minimize the effect of the outer power by installing the spikes between the tires to which a load of the large vehicle is not transmitted.

Another object of the present invention is to provide a sliding prevention device for a vehicle which can minimize the concentration of the spikes in one direction to transmit the uniform braking power to the dual wheels, so that driving capacity can be improved to result in maximum driving safety, by installing the spikes for preventing sliding between the tires of the dual wheels which are improved safety by installing two tires by means of the interval maintaining device, thereby maintaining the intervals at the time of rotating at high velocity.

Another object of the present invention is to provide a sliding prevention device for a vehicle which can improve the braking power to maximize the driving capacity to thereby increase driving safety by placing the spikes to move with the cushion of the tires in spite of the serious alteration of the road surface at the time of urgent cornering, and in which a plurality of the spikes are installed between the tires of the dual wheels by the locking portion, securing the spikes by means of the interval maintaining device. Each spike is formed to be triangular shaped with a wide surface facing the outer peripheral edge of the tires, an apex facing the center of the dual wheels, and a portion contacting with the tires at both sides, so that the plurality of spikes can be installed between the dual wheels in a closely contacted condition at certain intervals.

Another object of the present invention is to provide a sliding prevention device for a vehicle which can improve the ground contacting power of the braking portion positioned between the road surface and the tires, considering the condition of the road surface and the load of the vehicle, by forming the supporting portion of the spikes installed between the tires in various shapes, and in which a plurality of the spikes are installed between the tires of the dual wheels by the locking portion, engaging the spikes to each other by the interval maintaining device.

Another object of the present invention is to provide a sliding prevention device for a vehicle which can increase the use range by installing the braking portion selectively according to the condition of the road surface and the weather, and wherein the braking portion is configured to be triangular shaped having both sides contact with the center space of the dual wheels and outer peripheral edge contacting with the tires, and is provided with various braking members, so that, in case of icy roads, the braking member made of hard material is employed, and in the cases of driving in the desert, in swampy regions, or wet roads, the braking member made of soft material such as a urethane or a rubber can be employed according to the condition of the road surface.

Another object of the present invention is to provide a sliding prevention device for a vehicle which can enlarge the choice range by constructing the interval maintaining device for installing a plurality of spikes between the tires of the dual wheels in various shapes such as a wire, a chain, and a rotation rod according to the user's desire, and convenience in keeping and carrying, and can also reduce maintenance and repair costs by simply replacing the damaged spikes, because it includes only a plurality of spikes and an interval maintaining device having a locking portion to thereby make the structure and shape simple and easy to carry and maintain.

According to the present invention, the sliding prevention device for a vehicle can improve the installment capacity because it includes the light spikes and the wire to facilitate installment, and can minimize the possibility of accident by improving the driving capacity as it can be activated by producing an accurate braking power in spite of the vehicle load.

Also, it can maximize the safety of driving by minimizing the concentration of the spikes in one direction to thereby transmit the uniform braking power to the dual wheels to result in improvement of the driving capacity, and can improve the braking power to maximize the driving capacity to thereby increase the driving safety by making the spikes move with the cushion of the tires in spite of the serious alteration of the road surface at the time of urgent cornering.

Moreover, it can improve the ground contacting power of the braking portion positioned between the road surface and the tires, considering the condition of the road surface and the load of the vehicle, by forming the supporting portion of the spikes installed between the tires in various shapes, and can increase the generality of use by enlarging the use range by simply replacing the braking portion according to the condition of the road surface and the weather.

In addition, it can enlarge the choice range because the interval maintaining device can be made in various types and provide free choice chance according to the user's desire and the convenience in keeping and carrying, and can reduce maintenance and repair costs by simply replacing the damaged spikes, because it includes only a plurality of spikes and an interval maintaining device having a locking portion to thereby make the structure and shape simple and easy to carry and maintain.

Further objects and advantages of the present invention can be more fully understood from the following detailed description taken in conjunction with the accompanying drawings.

BRIEF DESCRIPTION OF THE DRAWINGS

FIG. 1 is a view showing the use state of a snow chain according to the conventional art;

FIG. 2 is a view showing the constitution of the sliding prevention device for a vehicle according to the present invention;

FIG. 3 is a side view showing the sliding prevention device for the vehicle according to the present invention;

FIG. 4 is a view showing the installment state of the sliding prevention device for the vehicle according to the present invention;

FIG. 5 is a perspective view showing a spike constituting the principal portion of the sliding prevention device for the vehicle according to the present invention;

FIG. 6 is a perspective view showing the spike with an engagement hinge of the sliding prevention device for the vehicle according to another embodiment of the present invention;

FIG. 7 is a front view showing the spike with the engagement hinge of the sliding prevention device for the vehicle according to another embodiment of the present invention;

FIG. 8 is a perspective view showing the spike with a close attachment hinge of the sliding prevention device for the vehicle according to still another embodiment of the present invention;

FIG. 9 is a front view showing the spike with the close attachment hinge of the sliding prevention device for the vehicle according to still another embodiment of the present invention;

FIG. 10 is a perspective view showing the spike with a close attachment slide of the sliding prevention device for the vehicle according to still another embodiment of the present invention;

FIG. 11 is a front view showing the spike with the close attachment slide of the sliding prevention device for the vehicle according to still another embodiment of the present invention;

FIG. 12 is a perspective view showing the spike with a braking plate having a braking sheet of the sliding prevention device for the vehicle according to still another embodiment of the present invention;

FIG. 13 is a view showing a rotation rod, which is another type of an interval maintaining device of the sliding prevention device for the vehicle according to still, another embodiment of the present invention;

FIG. 17 is a view showing the engagement state wherein the interval maintaining device of the sliding prevention device for the vehicle according to another embodiment of the present invention is used as a chain form; and FIG. 18 is a view showing another engagement state wherein the interval maintaining device of the sliding prevention device for the vehicle according to still another embodiment of the present invention is used as a chain form.

BRIEF DESCRIPTION OF THE INVENTION

Figure 14A:
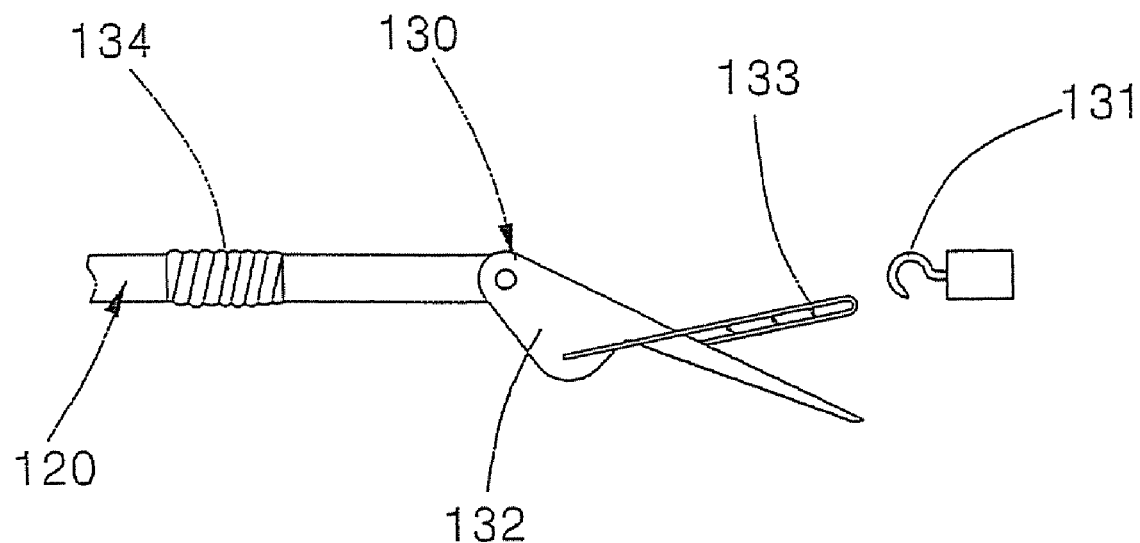
FIG. 14 (A-B) is a view showing the engagement of a locking portion, which is a principal portion of the sliding prevention device of the vehicle according to another embodiment of the present invention.

To accomplish the above object of the present invention, there is provided a sliding prevention device for a vehicle comprising a plurality of spikes, each of which is formed with a supporting device having a triangular shaped contacting portion including a wide surface facing toward the outer peripheral edge of the dual wheels and both right and left legs contacting between the dual wheels so that it can be supported between the tires of the dual wheels, a braking plate engaged with the supporting device in the outer peripheral edge of the dual wheels to produce braking power by contacting with the dual wheels, and an engaging portion formed at an inward apex between the tires of the dual wheels, an interval maintaining device adapted to engage with the engaging portion of the spike by inserting a wire and maintaining intervals between the plurality of spikes, and a locking portion including a ring shaped locking hook formed at one end of the wire in the interval maintaining device, an engaging lever having a length adjusting device and an elastic body formed at the other end of the wire, and a thrust prevention device formed to project at a position of the spike to be engaged, whereby the locking hook is adjusted in length by the length adjusting device and the elastic body to thereby engage with the engaging lever with the thrust of the spike being prevented by the thrust preventing device at the state of installing the plurality of spikes to the dual wheels after the spikes have been engaged with each other by the interval maintaining device.

Also, the spike is formed with an engaging hinge for rotating the engaging portion provided inwardly between the tires of the dual wheels, and an interval maintaining member projecting inwardly from the portion contacting with the dual wheels to thereby make the spike to rotate inwardly of the dual wheels to increase the braking power.

Further, the spike is formed with a contacting hinge rotating to the center side of the portion contacting with the dual wheels, and an extended supporting member at a portion connecting with the contacting hinge to thereby make the spike rotate inwardly of the dual wheels to increase the braking power.

In addition, the spike is formed with a contacting slide moving up and down slidably to the center side of the portion contacting with the dual wheels, and an interval maintaining member projecting inwardly from the portion contacting with the dual wheels to thereby move up and down slidably to adjust the intervals inwardly of the dual wheels to increase the braking power.

Moreover, the spike is formed with a replaceable braking projection at the lower portion of the braking plate producing the braking power while contacting the dual wheels, to thereby produce the braking power while contacting the ground between the dual wheels and the road surface.

Further, the spike is formed with a braking sheet made of soft material such as a urethane and a waste tire at the lower portion of the braking plate producing the braking power contacting the dual wheels, to thereby produce the braking power with contacting the ground between the dual wheels and the road surface.

Also, the interval maintaining device is formed by semi-circular shaped rotation rods engaged with each other by rivets provided at one end thereof so that it can engage with the spikes at certain intervals, and it can be easily carried and kept by rotating about the rivets and folding the rotation rods by a certain length to thereby install the plurality of spikes to the dual wheels at certain intervals.

In addition, the locking portion includes a locking hook at one end of the interval maintaining device, and an engaging lever formed at the other end and connected to an elastic body while rotating about the hinge portion, so that the locking hook is engaged with the engaging lever by rotating the lever to thereby couple the plurality of spikes and the interval maintaining device to the dual wheels.

Further, the locking portion is formed with a through-hole type securing opening having threads formed therein at one side of the engaging portion in the spike to thereby secure one end of the interval maintaining device to the spike located around the peripheral surface of the dual wheels, and an engaging securing portion at the other end to thereby secure the locking portion to the securing opening of the spike by means of a securing tool, resulting in the installment of the plurality of spikes to the dual wheels being engaged with the interval maintaining device.

Also, the supporting device of the spike is formed with a through-hole type chain connecting opening at both upper ends, and the interval maintaining device for maintaining the intervals between the plurality of spikes is formed of a chain made by connecting a plurality of square shaped oval bodies, to thereby make it possible to engage the chain into the connecting opening, resulting in the installment of the device to the dual wheels certain intervals maintained between the spikes.

Moreover, the supporting device of the spike is centrally formed with a chain securing opening, and the interval maintaining device for maintaining the intervals between the plurality of spikes is formed of a chain made by connecting a plurality of square shaped oval bodies, to thereby engage the chain into the chain securing opening of the spike by way of securing means with certain intervals maintained between the plurality of spikes, resulting in the installment of the device to the dual wheels with certain intervals maintained between the spikes.

Hereinafter, the sliding prevention device for a vehicle of the present invention will be described in detail with reference to the appended drawings.

Figure 14B:
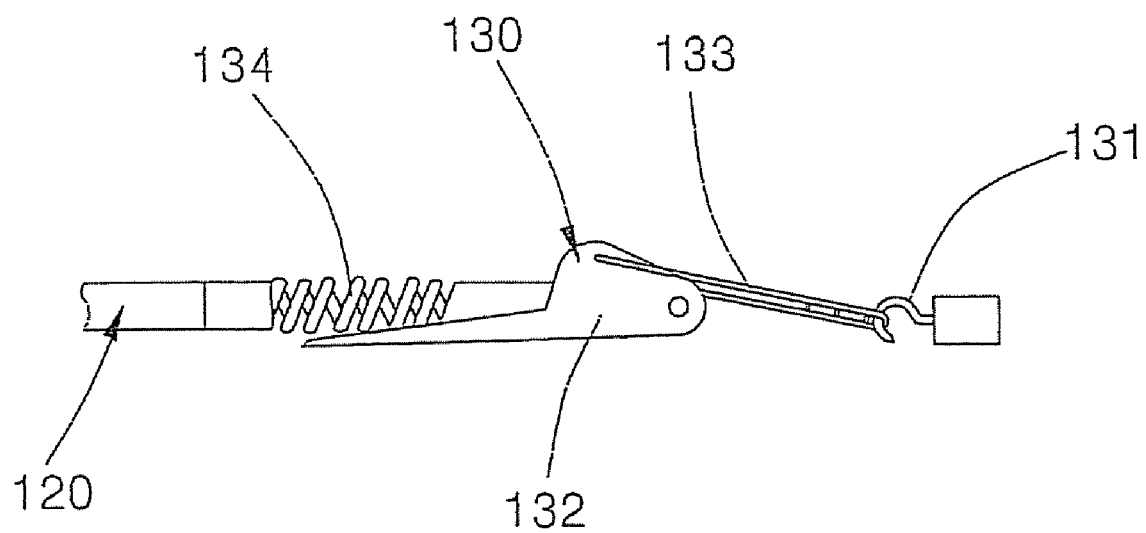
Figure 15A:
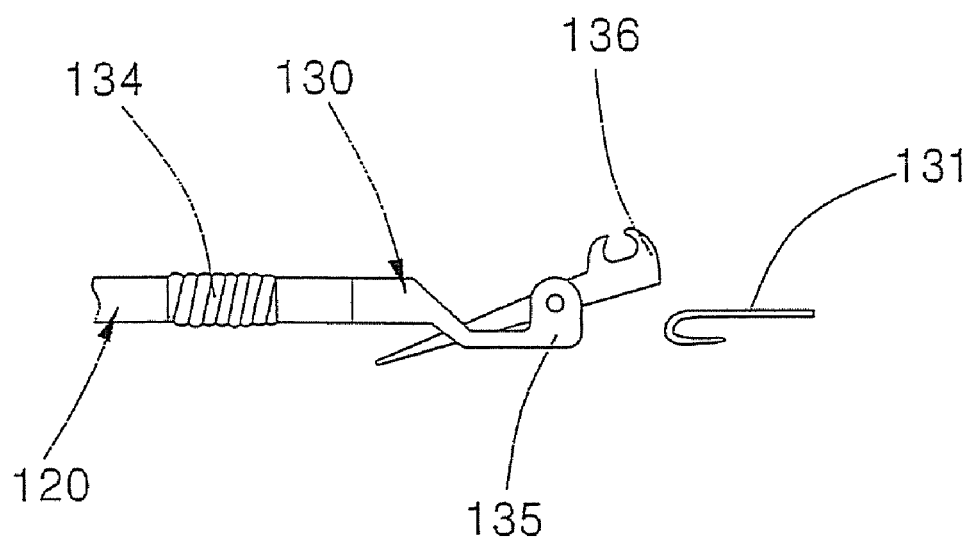
FIG. 15 (A-B) is a view showing the engagement of the locking portion, which is a principal portion of the sliding prevention device of the vehicle according to still another embodiment of the present invention.
Figure 15B:
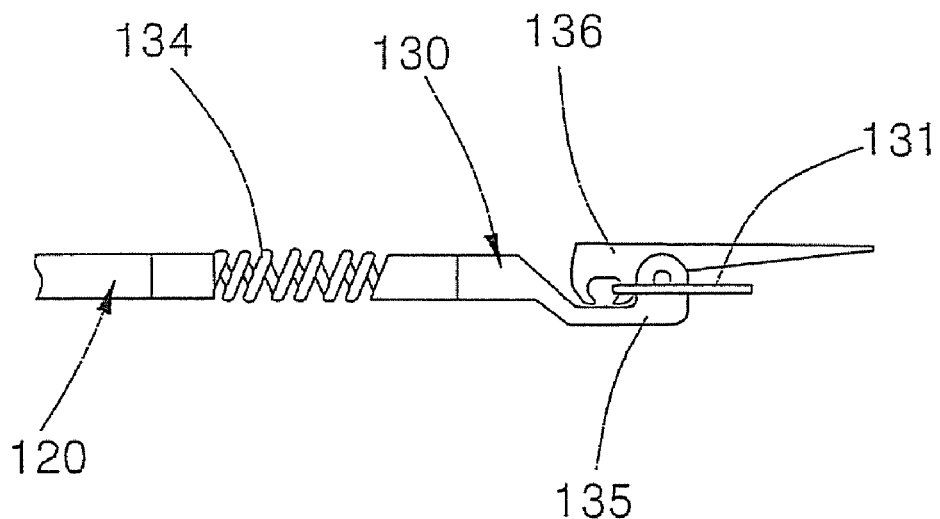
Figure 16A:
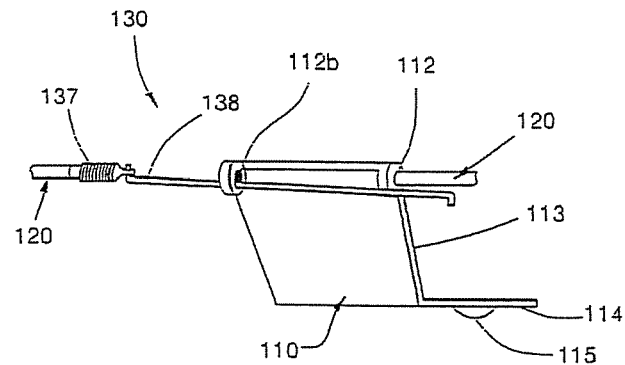
FIG. 16 (A-D) is a view showing the engagement of the locking portion, which is a principal portion of the sliding prevention device of the vehicle according to still another embodiment of the present invention.
Figure 16B:
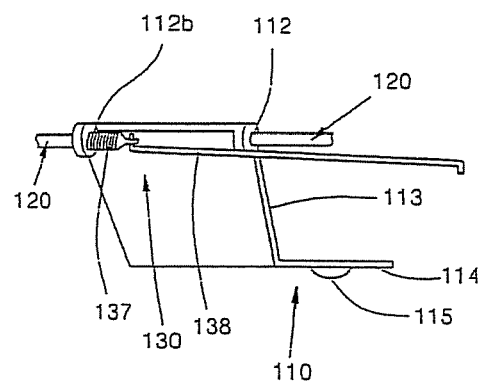
Figure 16C:
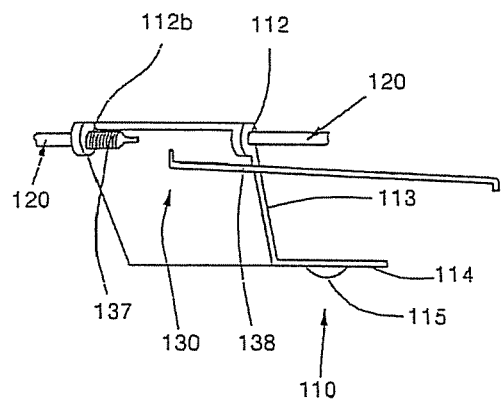
Figure 16D:
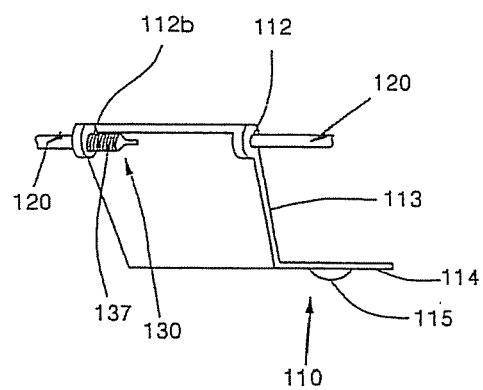

As shown in FIGS. 2 to 18, the sliding prevention device 100 for a vehicle according to the present invention comprises spikes 110 for braking the dual wheels 1, respective of which is provided with a braking plate 114 to produce braking power by close contact with the dual wheels 1 installed to the rear side of the large vehicle and to form a supporting device 111 between the tires of the dual wheels 1, an interval maintaining device 120 provided to connect and engage with the spikes 110 so that they can be engaged with each other at certain intervals, and a locking portion 130 provided at both ends of the interval maintaining device 120 for engaging and securing the spikes 110 at the state of installing to the dual wheels 1.

The spike 110 is provided with a supporting device 111 having a contacting portion 113 so that it can be supported between the tires of the dual wheels 1 installed to the rear side of the large vehicle, wherein the contacting portion is formed as a triangular shape, and the wide surface of which is directed to the outer peripheral edge side of the device and respective left and light surface thereof is in close contact between the dual wheels, a braking plate 114 for producing the braking power by engaging with the supporting device 111 at the outer peripheral edge of the dual wheels 1 and contacting with the dual wheels 1, and an engaging portion 112 formed at the inner side of the apex of the triangle between the tires of the dual wheels 1, wherein the above elements are provided by plural numbers and are engaged with each other.

In this instance, the spike 110 may be provided with an engaging hinge 112a for rotating the engaging portion 112 formed between the tires of the dual wheels 1, and an interval maintaining member 113a projecting to the inner side of the contacting portion which is contacted with the dual wheels 1, so that it can only be rotated in the inward direction to thereby increase the braking power.

Further, the spike 100 can be provided with a contacting hinge 113b rotating in the center side of the portion 113 contacting with the dual wheels 1 and a supporting member 113c at the connecting portion of the contacting hinge 113, so that it can rotate in the inward direction of the dual wheels 1 to thereby increase the braking power.

Also, the spike 110 can be provided with a contacting slide 113d which moves up and down slidably in the center side of the portion 113 contacting with the dual wheels 1 and an interval maintaining member 113a projecting inwardly from the portion contacting with the dual wheels 1, so that it can move up and down slidably to adjust the intervals only in the inward direction of the dual wheels 1 to thereby increase the braking power.

Additionally, the spike 110 can be provided with a replaceable braking projection 115 at the lower portion of the braking plate 114 producing the braking power by contacting with the dual wheels 1, so that it can produce the braking power by contacting between the dual wheels 1 and the road surface.

Moreover, the spike 110 can be provided with a braking sheet 116 made of soft materials such as a urethane or waste tires at the lower portion of the braking plate 114 producing braking power by contacting with the dual wheels 1, so that it can produce braking power while contacting the ground between the dual wheels 1 and the road surface.

The interval maintaining device 120 is configured to engage the plurality of spikes 110 with each other with the intervals maintained therebetween by inserting a wire 121 through the engaging portion 112 of the spike 110.

In this instance, the interval maintaining device 120 can be constructed by forming a rotation rod 124 of a semi-circular shaped-end with rivets 125 so that it can be engaged with the spikes 110 with certain intervals maintained therebetween, and it can be folded by a predetermined length by rotating the rotation rod 124 about the rivets to thereby make it easy to keep and maintain, therefore, it can be installed to the dual wheels 1 with certain intervals maintained between the plurality of spikes 110.

The locking portion 130 is provided with a ring shaped locking hook 131 at one end of the wire 121 in the interval maintaining device 120, an engaging lever 132 having a length adjusting device 133 for adjusting the length and an elastic body 134, and a thrust prevention device 139 formed at the spike 110, so that the interval maintaining device 120 can be engaged by adjusting the length of the locking hook 131 at the length adjusting device 133 and the elastic body 134, with the thrust of the spikes 110 being prevented by the thrust prevention device 139, when the spikes 110 of the dual wheels 1 are installed by the plurality of interval maintaining device 120.

The locking portion 130 can be constructed such that a locking hook 31 is provided at one end of the interval maintaining device 120 and an engaging lever 136 is provided at the other end thereof by means of an elastic body 134 to rotate about a hinge portion 135 and engage with the locking hook 131 to thereby cause the plurality of spikes 110 and the interval maintaining device 120 to be installed to the dual wheels 1.

Also, in the locking portion 130, one side of the engaging portion 112 in the spike 110 is formed with a through-hole type securing opening 112b formed with threads at the inside, to thereby secure one end of the interval maintaining device 120 to the spike 110 located around the peripheral surface of the dual wheels 1, and an engaging securing portion 137 is provided at the other end of the locking portion to engage the locking portion with the securing opening 112b of the spike 110 by means of a securing tool 138, resulting in the installment of the plurality of spikes 110 to the dual wheels 1 while being engaged with the interval maintaining device 120.

Further, the supporting device 111 of the spike 110 is provided with a through-hole type chain connecting opening 117 at both upper ends, and the interval maintaining device 120, which is configured to maintain the intervals between the plurality of spikes 110, is formed of a chain 122 made by connecting a plurality of square shaped oval bodies, to thereby make it possible to engage the chain into the connecting opening 117, resulting in the installment of the device to the dual wheels 1 with certain intervals maintained between the spikes 110.

Moreover, the supporting device 111 of the spike 110 is formed with a chain securing opening 118, and the interval maintaining device 120 for maintaining the intervals between the plurality of spikes 110 is formed of a chain 122 made by connecting a plurality of square shaped oval bodies, to thereby engage the chain 122 into the chain securing opening 118 of the spike 110 by way of securing means 123 with certain intervals maintained between the plurality of spikes 110, resulting in the installment of the device to the dual wheels 1 with certain intervals maintained between the spikes 110.

Hereinafter, the engaging type and action of the sliding prevention device for a vehicle according to the present invention constructed as such will be described below.

First of all, considering the condition of the road surface depending on the weather and the road way, the braking projections 115 is provided with the braking plate 114 for preventing sliding on an icy road, whereas the braking sheet 116 made of the soft material such as a urethane and waste tires is formed with the braking plate 114 when driving a slippery road due to rainfall and in desert and a swamp regions and so on, then the plurality of spikes 110 are engaged with each other by inserting the interval maintaining device 120 into the engaging portion 112 formed at the end of the supporting device 111. In this regard, the number of engaged spikes 110 is determined based on the condition of the road surface and the dual wheels, and the size of the dual wheels 1.

Here, as the spike 110 is formed with the engaging hinge 112a so that the engaging portion 112 located at the inner side of the tires of the dual wheels 1 can rotate, and is formed with the interval maintaining member 113a projecting to the inside of the portion 113 contacting with the dual wheels 1, the spike is prevented from rotating in the road surface side, which is the outer side of the dual wheels 1, and is rotated toward the dual wheels 1 to thereby increase the power contacting with the ground, resulting in the production of the maximum braking power.

Also, as the spike 110 can be formed with the contacting hinge 113b rotating toward the center of the portion 113 contacting with the dual wheels 1, and is formed with the extended supporting member 113c at a portion connected to the contacting hinge 113b, the spike 110 is prevented from rotating in the road surface side, which is the outer side of the dual wheels 1, and is rotated toward the dual wheels 1 to thereby increase the power contacting the ground, resulting in the production of the maximum braking power.

Further, the spike 110 can be formed with the contacting slide 113d which moves up and down at the center side of the portion 113 contacting with the dual wheels 1, and is formed with the interval maintaining member 113a projecting toward the inside of the portion 113 contacting with the dual wheels 1, so that intervals between the spike can only be adjusted in the inward direction of the dual wheels 1 and be prevented from being adjusted in the outside of the dual wheels 1, which is the road surface side, resulting in the production of maximum braking power by increasing the power contacting with the ground.

As described above, after the optional number of spikes 110 have been engaged with each other by means of the wire 121 of the interval maintaining device 120, the braking plate 114 of the spike 110 is arranged between the tires of the dual wheels 1 to be positioned at the outside of the dual wheels 1, and the contacting portion 113 of the spike 110 is contacted with the inner left and right side of the dual wheels 1 to thereby minimize the movement of the spike.

Then, the interval maintaining device 120 is arranged to engage with the spike 110 at certain intervals by engaging the semi-circular shaped rotation rod 124 with the rivet 125. In this instance, if the spike 110 is not used, the rotation rod 124 is rotated about the rivet 125 to be folded by a predetermined length to make it easy to keep and carry, resulting in the installment of the plurality of spikes 110 to the dual wheels 1 at certain intervals.

As described above, after the plurality of spikes 110 have been installed between the tires of the dual wheels 1 while maintaining certain intervals by means of the interval maintaining device 120, the locking hook 131, provided at one end of the interval maintaining device 120 is engaged with the ladder shaped length adjusting device 133 formed at the other end to adjust the interval accurately, and is secured to the spike 110 to be engaged by using the elasticity of the elastic body 134 connected with the length adjusting device 133 by operating the engaging lever 132 with the push being prevented by the thrust prevention device 139, and then the plurality of spikes 110 are installed between the tires of the dual wheels 1 after engaging the spikes with each other by using the interval maintaining device 120, and the locking portion 130 is secured, to thereby install the spike firmly to the dual wheels 1, resulting in the completion of the installment of the sliding prevention device to the dual wheels 1.

Then, the locking portion 130 is constructed to have a locking hook 131 at one end thereof toward the interval maintaining device 120, and an engaging lever 136 rotating about the hinge portion 135, and engagement is formed at the other end thereof by means of the elastic body 134, in such a structure the locking hook 131 is engaged with the hinge portion by rotating the engaging lever 136 to thereby engage the plurality of spikes 110 and the interval maintaining device 120 with the dual wheels 1.

Also, in the locking portion 130, one side of the engaging portion 112 in the spike 110 is provided with a through-hole type engaging opening 112b formed with threads at the inside, to thereby engage one end of the interval maintaining device 120 with the spike 110 located around the peripheral surface of the dual wheels 1, and an engaging securing portion 137 is provided at the other end of the locking portion to engage the locking portion with the engaging opening 112b of the spike 110 by means of an engaging tool 138, resulting in the installment of the plurality of spikes 110 to the dual wheels 1 with being engaged with the interval maintaining device 120.

Hereinafter, other embodiments of the sliding prevention device for a vehicle of the present invention constructed as such will be described below.

The supporting device 111 of the spike 110 is provided with a through-hole type chain connecting opening 117 at both upper ends, and the interval maintaining device 120, which is configured to maintain the intervals between the plurality of spikes 110, is formed of a chain 122 made by connecting a plurality of square shaped oval bodies, to thereby make it possible to engage the chain 122 into the connecting opening 117, resulting in the installment of the device to the dual wheels 1 with certain intervals maintained between the spikes 110.

The chain 122 of the interval maintaining device 120, which is configured to maintain the intervals between the plurality of spikes 110 and is formed of the chain 122 made by connecting the plurality of square shaped oval bodies and is engaged into the securing opening 118 of the spike 110 by way of the engaging means 123 at certain intervals, resulting in the installment of the device to the dual wheels 1 with certain intervals maintained between the spikes 110.

As described above, according to the sliding prevention device for the vehicle of the present invention, it is easy to keep and maintain the spike for improving the braking power because the braking projection 115 and the braking sheet 116 can be selectively installed to the braking plate 114 depending on the weather and the condition of the road surface. It is also easy to keep and maintain the spike 110 because the chain 122, the wire 121 and the rotation rod 124 can be engaged with the interval maintaining device 120 at certain intervals, and be installed stably between the tires of the dual wheels 1 and secured by means of the locking portion 130. It is easy to install because it can be inserted and engaged into the space of the dual wheels 1 without any shifting of the vehicle, and it can generally be utilized and can increase handling capacity to thereby maximize the driving safety because it can be applied to slippery roads such as wet roads, and to the topology such as the icy roads in the winter and the desert and swamp areas difficult for the large vehicle to drive by replacing the braking plate 114 depending on the weather and the condition of the road surface.

While the present invention has been described with reference to the preferred embodiments, the present invention is not restricted by the embodiments. It is to be appreciated that those skilled in the art can change or modify the embodiments without departing from the scope and spirit of the present invention. However, such variations and modifications all pertained to the scope of the present invention.

The invention claimed is:

1. A traction device for a vehicle comprising:
a plurality of spikes, each of which is formed with a supporting device having a triangular shaped contacting portion including an inside surface facing toward an outer peripheral edge of dual wheels and both a right and a left leg of the triangular shaped contact portion contacting between the dual wheels so that the spike can be supported between tires of the dual wheels, a friction plate engaged with the supporting device at the outer peripheral edge of the dual wheels to produce the friction by contacting with the dual wheels, and an engaging portion formed at a radially inward apex of the triangular shaped contacting portion between the tires of the dual wheels;
an interval maintaining device adapted to engage with the engaging portion of the spike by insertion of a wire and maintain the intervals between the plurality of spikes; and
a locking portion including a ring shaped locking hook formed at one end of the wire of the interval maintaining device, an engaging lever having a length adjusting device and an elastic body formed at the other end of the wire, and a retention device projecting from the wire to engage one of the spikes, wherein the locking hook is adjusted in length by the length adjusting device and the elastic body to engage the engaging lever and movement of the spike engaged by the retention device is prevented by the retention device during installation of the plurality of spikes on the dual wheels after the spikes have been engaged with each other by the interval maintaining device.

2. The traction device for a vehicle according to claim 1, wherein the spike is formed with an engaging hinge for rotating the engaging portion provided radially inward between the tires of the dual wheels, and an interval maintaining member projecting from the inside surface of the triangular shaped contacting portion to allow the spike to rotate toward the outer peripheral edge of the dual wheels to increase friction.

3. The traction device for a vehicle according to claim 1, wherein the spike is formed with a contacting hinge for rotating the triangular shaped contacting portion provided at a central portion of the triangular shaped contacting portion, and an extended supporting member provided at a portion of the triangular shaped contacting portion connecting with the contacting hinge to allow the spike to rotate toward the outer peripheral edge of the dual wheels to increase friction.

4. The traction device for a vehicle according to claim 1, wherein the spike is formed with a contacting slide slidably movable radially inward and outward with respect to the dual wheels and provided at a central portion of the triangular shaped contacting portion, and an interval maintaining member projecting from the inside surface of the triangular shaped contacting portion to allow the triangular shaped contacting portion to slidably move radially inward and outward with respect to the dual wheels to adjust a length of the triangular shaped contacting portion to increase friction.

5. The traction device for a vehicle according to claim 1, wherein the spike is formed with a replaceable friction projection at a radially outward portion of the friction plate producing friction, while contacting the dual wheels, to produce friction while contacting the ground between the dual wheels and the road surface.

6. The traction device for a vehicle according to claim 1, wherein the spike is formed with a friction sheet made of elastomeric material at the radially outward portion of the friction plate producing friction, while contacting the dual wheels, to produce friction while contacting the ground between the dual wheels and the road surface.

7. The traction device for a vehicle according to claim 1, wherein the interval maintaining device is formed by semi-circular shaped rotation rods engaged with each other by rivets provided at one end thereof so that the interval maintaining device can engage the spikes at spaced intervals, and the interval device can be carried and stored by rotating about the rivets and folding the rotation rods.

8. The traction device for a vehicle according to claim 1, wherein the locking portion includes a locking hook formed at one end of the interval maintaining device, an engaging lever formed at the other end and connected to an elastic body while rotating about a hinge portion, so that the locking hook is engaged with the engaging lever by rotating the lever to couple the plurality of spikes and the interval maintaining device to the dual wheels.

9. The traction device for a vehicle according to claim 1, wherein the locking portion is formed with a through-hole type securing opening at one side of the engaging portion in the spike to secure one end of the interval maintaining device to the spike located around a peripheral surface of the dual wheels, and an engaging securing portion at the other end to secure the locking portion to the securing opening of the spike by way of a securing tool.

10. The traction device for a vehicle according to claim 1, wherein the supporting device of the spike is formed with a chain connecting opening at both ends of the supporting device, and the interval maintaining device for maintaining the intervals between the plurality of spikes is formed of a chain made by connecting a plurality of links, to allow the chain to engage the connecting opening.

11. The traction device for a vehicle according to claim 1, wherein the supporting device of the spike is formed with a chain securing opening at a central portion of the supporting device, and the interval maintaining device for maintaining the intervals between the plurality of spikes is formed of a chain made by connecting a plurality of links the chain engaging the chain securing opening of the spike by way of a securing device with spaced intervals maintained between the plurality of spikes.

* * * * *